United States Patent
White

(10) Patent No.: US 11,985,966 B1
(45) Date of Patent: May 21, 2024

(54) ANIMAL TRAP

(71) Applicant: Jesse Jonah White, Hardin, IL (US)

(72) Inventor: Jesse Jonah White, Hardin, IL (US)

( * ) Notice: Subject to any disclaimer, the term of this patent is extended or adjusted under 35 U.S.C. 154(b) by 12 days.

(21) Appl. No.: 17/890,898

(22) Filed: Aug. 18, 2022

(51) Int. Cl.
*A01M 23/26* (2006.01)

(52) U.S. Cl.
CPC .................................. *A01M 23/26* (2013.01)

(58) Field of Classification Search
CPC .... A01M 23/28; A01M 23/245; A01M 23/00; A01M 23/24; A01M 23/26; A01M 23/265; A01M 23/30; A01M 23/34; A01M 23/36
USPC ............................. 43/81.5, 58, 77–81, 85–96
See application file for complete search history.

(56) References Cited

U.S. PATENT DOCUMENTS

| | | | | |
|---|---|---|---|---|
| 1,439,809 | A * | 12/1922 | Friess | A01M 23/24 |
| | | | | 43/89 |
| 2,683,951 | A | 7/1952 | Hamaker | |
| 3,010,245 | A | 3/1958 | Conibear | |
| 4,129,959 | A | 12/1978 | Souza | |
| 4,158,929 | A | 6/1979 | Custard | |
| 4,601,128 | A | 7/1986 | Danison | |
| 4,766,694 | A * | 8/1988 | Buckley | A01M 23/245 |
| | | | | 177/25.19 |
| 6,904,713 | B2 | 6/2005 | Beauregard | |
| 2012/0174469 | A1* | 7/2012 | Gardner | A01M 23/08 |
| | | | | 43/60 |
| 2020/0344996 | A1* | 11/2020 | Marks | A01M 23/30 |
| 2021/0015088 | A1* | 1/2021 | McGrade | A01M 23/245 |

OTHER PUBLICATIONS

The Best Conibear Traps, Sets, and Sizes for Survival Trapping [online]. True Prepper, Apr. 18, 2020. Retrieved from the Internet: <URL: https://www.trueprepper.com/best-conibear-traps/#:~:text=The%20Best%20Conibear%20Trap%20Setting%20Tool&text=The%20Funke%20Trap%20Tags%20Model,1%20and%20%232%20sizes>.
2.5" Round Body Grip w/ Uni-bracket [online]. Wildlife Control Supplies, Aug. 12, 2022. Retrieved from the Internet: <URL: https://www.wildlifecontrolsupplies.com/animal/NBRBG25WB.html>.
Frank Ralph Conibear Article [online]. Arctic Profiles, Aug. 12, 2022. Retrieved from the Internet: <URL: https://pubs.aina.ucalgary.ca//arctic/Arctic36-4-386.pdf>.
Newspaper Tubes for Trapping Marten [online]. Trapping Today, Oct. 5, 2008. Retrieved from the Internet: <URL: https://www.trappingtoday.com/newspaper-tubes-for-trapping-marten/>.
Mink Box Plans [online]. Trap-Anything.com, Aug. 2, 2022. Retrieved from the Internet: <URL: https://www.trap-anything.com/mink-box-plans.html>.

* cited by examiner

*Primary Examiner* — Joshua J Michener
*Assistant Examiner* — Nicole Paige MacCrate
(74) *Attorney, Agent, or Firm* — CreatiVenture Law, LLC; Dennis J M Donahue, III

(57) ABSTRACT

The present invention is an improved body gripping style animal trap and corresponding housing. The trapping mechanism operates in the same fashion as a single-spring body gripping style trap with a pair of corresponding jaws, trigger mechanism made from a trigger and dog and a peripheral spring that biases the set jaws into the sprung position, thereby gripping and killing the animal within the housing. Opposite from the spring the improved trap incorporates a post that allows the jaws to rotate as intended but maintains them in place within the housing with a fastener.

20 Claims, 9 Drawing Sheets

ANIMAL TRAP

CROSS-REFERENCE TO RELATED APPLICATIONS

This application is an original filing of the invention as a non-provisional patent application and does not claim a right of priority to any other application or the benefit of an earlier filing date.

STATEMENT REGARDING FEDERALLY SPONSORED RESEARCH

Not Applicable.

APPENDIX

Not Applicable.

BACKGROUND OF THE INVENTION

Field of the Invention

The present invention relates to animal traps, and more particularly to an improved body gripping style trap and housing.

Related Art

Animal traps have long been used to remotely catch animals for a variety of purposes which include but are not necessarily limited to food, fur, trading, hunting, pest control and wildlife management. Most animal traps fall into one of six categories, namely, foothold traps, body gripping traps, snares, deadfalls, cages and glue traps, with each trap type differing in function. Although these and other trap types differ in function, they further differ in intended purpose with restraining traps used to trap the animals alive for later release while kill traps are used to kill the animal. Persons having an ordinary skill in the art will appreciate that numerous trap designs have been developed that effectively restrain or kill animals but there is a continual desire to produce improved traps that not only are better at trapping the target animal but also are more likely to humanly restrain or kill the animal as intended.

Problems exist in current kill-trap designs which are meant to immediately kill the animal but do not always do so. When they function properly, crushing and choking kill-traps quickly kill the animal and do not leave the animal in pain. However, kill-traps are enormously faulty which can leave a trapped animal in shock before a slow and painful death. Furthermore, traps are incapable of discrimination between target and non-target species who may inadvertently set the trap. Accordingly, there is a continual desire in the art to develop improved traps which better assure humane kills of the targeted animal. Similarly, there is a desire in the art to provide trap accessories which can be used in combination with various types of traps to increase the likelihood that these traps successfully kill targeted animals in a humane manner.

A now well-known body-gripping kill trap was developed by Frank Conibear in the 1950s which provided trappers with a compact, lightweight and portable trap that could be set in a variety of positions for catching various types and sizes of species without damaging their coats. As described in U.S. Pat. No. 3,010,245, the original CONIBEAR® style trap used a pair of jaws that were sprung into a closed position by a spring when an animal set off the trigger operatively connected to the jaws. When sprung, the force of the jaws closing quickly grips and kills the animal either from the force applied to the body of the animal or from choking if the animal was not killed by the initial force of the sprung trap.

Although effective when they function properly, the CONIBEAR® trap and similar body gripping spring traps are inherently unstable and can shift after they have been set by the trapper. To facilitate probability and limit complexity, it is generally a desire to those having an ordinary skill in the art to develop traps that have as few parts as possible. The trap described in the '245 Patent and others like it, like those shown in FIGS. 1A and 1B, are supported by the jaws themselves and do not have an exterior skeletal structure in which jaws operate. Rather, these traps are self-supporting and are tethered down with a chain or rope to prevent an animal that is not killed when the trap is sprung from running off. Although this reduces the number of parts, the lack of a supporting structure makes the traps unstable and susceptible to being accidently sprung. For example, a strong breeze or an animal nudging the exterior of the trap can cause it to move which may inadvertently spring the trap without an animal in the jaws. Once sprung, the trap is rendered useless until it is found and reset by the trapper. Even worse, unintended movement in a trap after it is set increases the likelihood that the trap does not function properly and humanely dispatch of the target animal.

Another problem exists with body gripping traps that may be sized to humanely kill a target animal but cannot prevent other non-targeted animals from springing the trap. For example, these traps are routinely sized for rodents and used for pest control, such is in a barn or garage. However, non-targeted animals like domestic housecats may also live in these environments and could be attracted to the bait used to lure the target animal into the trap. Although, these non-targeted animals may be much larger than the targeted animal and therefore may not be killed by the trap, they can still spring the trap by actuating the trigger an injure themselves. Accordingly, there remains a need in the art to provide an improved trap that does a better job at preventing non-targeted animals from spring the trap.

With particular regard to modifications for CONIBEAR® style traps, many do-it-yourself housing designs are available as shown in the prior art FIGS. 2A and 2B. Generally, these designs incorporate a tubular box structure with an inner diameter sized to hold the jaws of the trap. To accommodate the springs which extend from the perimeter of the jaws and to allow the trap to slide into the structure and operate therein, slots are provided on each side and receive the springs. Although these designs can block wind and prevent the trap from an animal knocking the jaws, they do not connect to the trap itself and therefore fail to provide an adequate support structure. Thus, there remains a desire to those having an ordinary skill in the art to provide an improved trap and supporting structure.

SUMMARY OF THE INVENTION

The present invention is an improved body gripping style animal trap and corresponding housing. The trapping mechanism operates in the same fashion as a single-spring body gripping style trap with a pair of corresponding jaws, trigger assembly made from a trigger mechanism and dog and a torsion spring with arms that connect to the jaws and bias them into the sprung position, thereby gripping and killing the animal. Opposite from the spring the improved trap incorporates a post that allows the jaws to rotate as intended but maintains them in place within the housing with a fastener.

The housing is a tubular body with an opening through which the animal enters the trap. The trapping mechanism is situated within the interior of the housing with the peripheral spring extending through a slot in one side of the housing while the post extends through an aperture in the opposite side. Subsequently, the trapping mechanism is secured within the housing by securing the fastener to the distal end of the post on the exterior of the housing.

To attract target animals to the trap, a bait tray is removable secured within the housing between the trapping mechanism and the opposite end of the housing from the opening in single opening embodiments or between a pair of trapping mechanisms in the preferred double opening embodiment. The bait tray is accessible to the trapper without necessarily removing or disturbing the trapping mechanism itself and thereby allows the trapper to change bait without having to reset the entire trap.

Gates are also provided on each of the openings to reduce the opening size and inhibit access of non-target animals. In addition, setting tool holders are fixed onto the exterior of the housing to provide the trapper with a unitary trap and setting system.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1A:
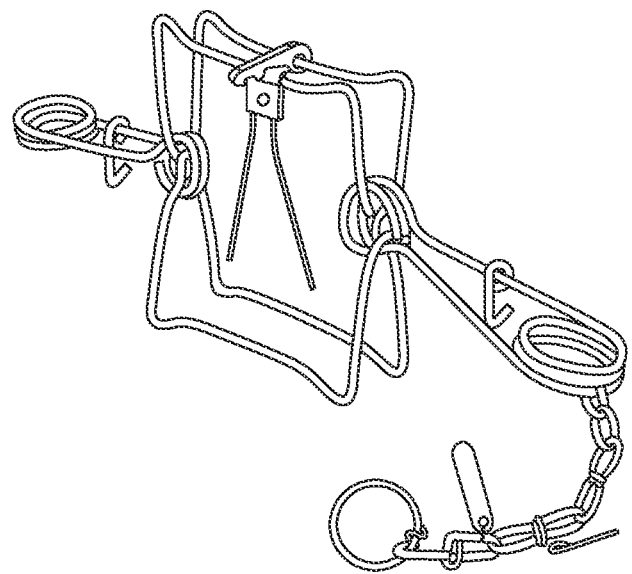
FIGS. 1A and 1B show traps in the prior art.
Figure 1B:
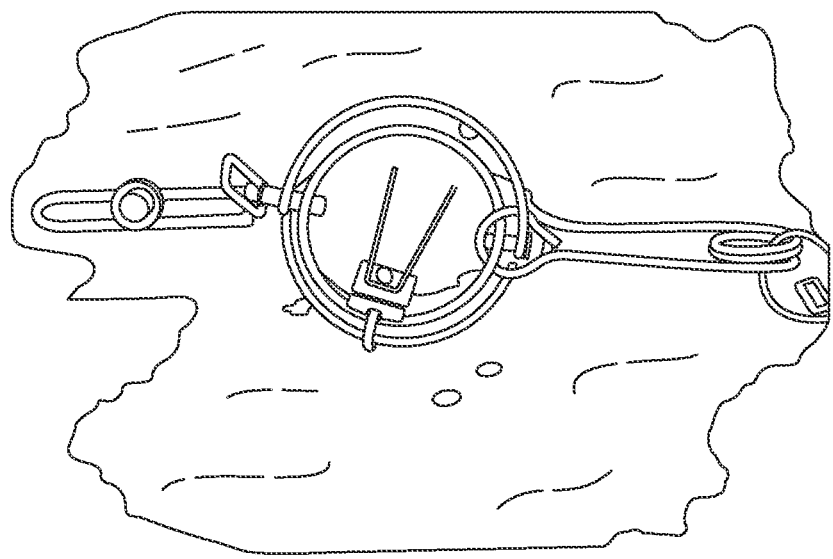
Figure 2A:
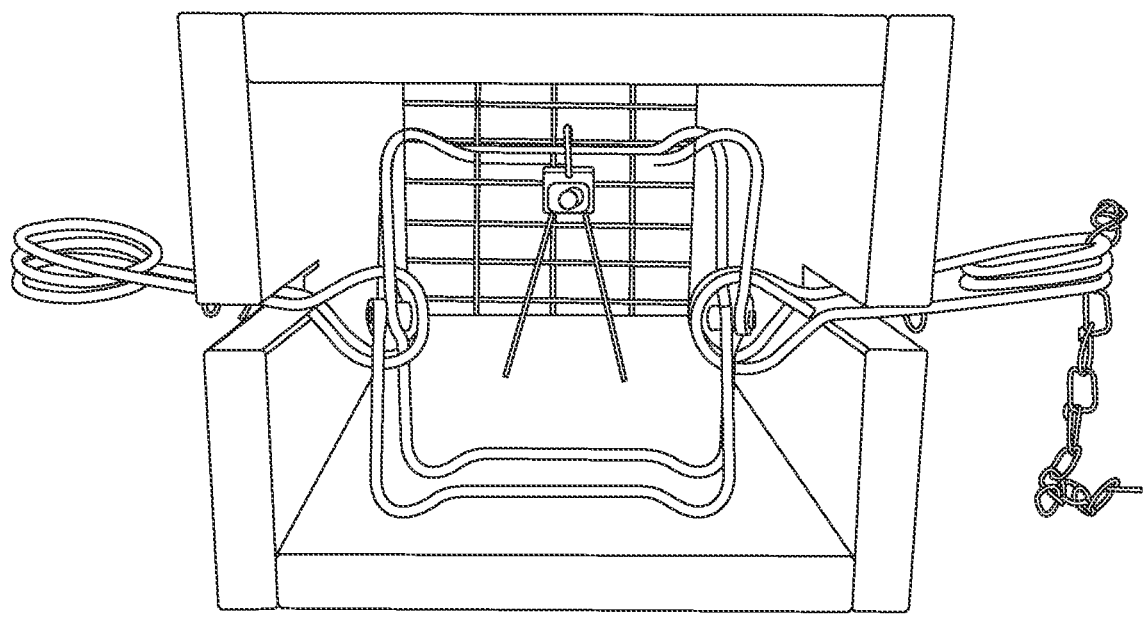
FIGS. 2A and 2B show retrofitted traps in the prior art.
Figure 2B:
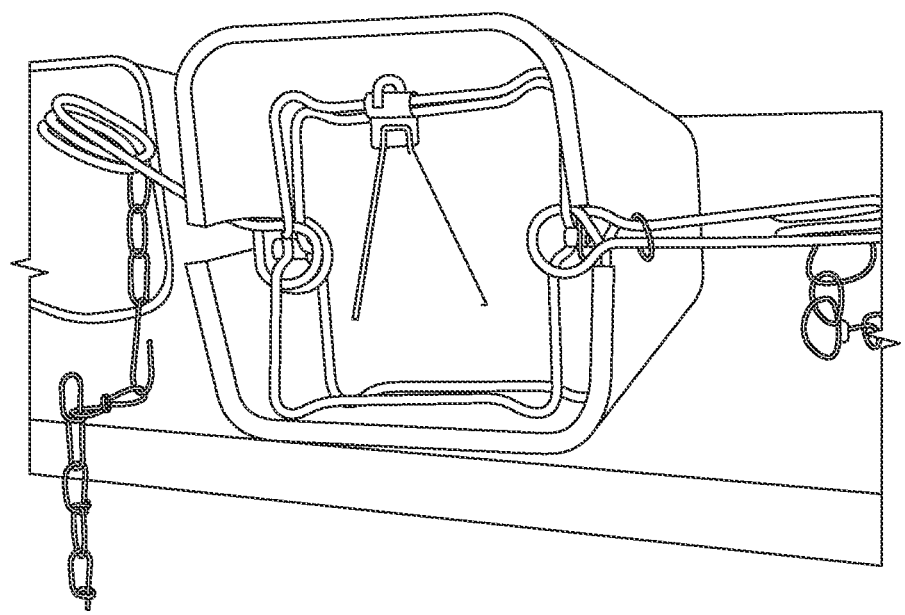

The following description of the preferred embodiment(s) is merely exemplary in nature and is in no way intended to limit the invention, its application, or uses.

The improved animal trap of the present invention has a tubular housing with the trapping mechanism removably supported therein to allowed the trapper to set the trap and subsequently remove the trapping mechanism and trapped animal from the housing. In the preferred embodiment described herein, the improved trap includes a body gripping style trap that is modified operate with a single spring and secure within the housing opposite from the spring as explained below. However, it will be appreciated that embodiments of the present invention may include a traditional dual-spring body gripping style trapping mechanism or various other trapping mechanisms without departing from the present invention as explained herein.

In the preferred embodiment the improved trap operates with a single-spring body gripping style trapping mechanism 100 having a jaw portion 110 and peripheral spring 120 and post portions 130 connected to opposite sides of the jaw portion. As with body gripping style traps in the prior art, the jaw portion includes a pair of jaws 112a and 112b that rotate with respect to another between a set position 102a and sprung position 102b. In addition, the jaw portion incudes a trigger assembly 114 with a trigger mechanism 116 that is operatively connected to a dog 118 that holds the jaws in the set position and subsequently releases the jaws when the trigger is actuated.

Figure 7A:
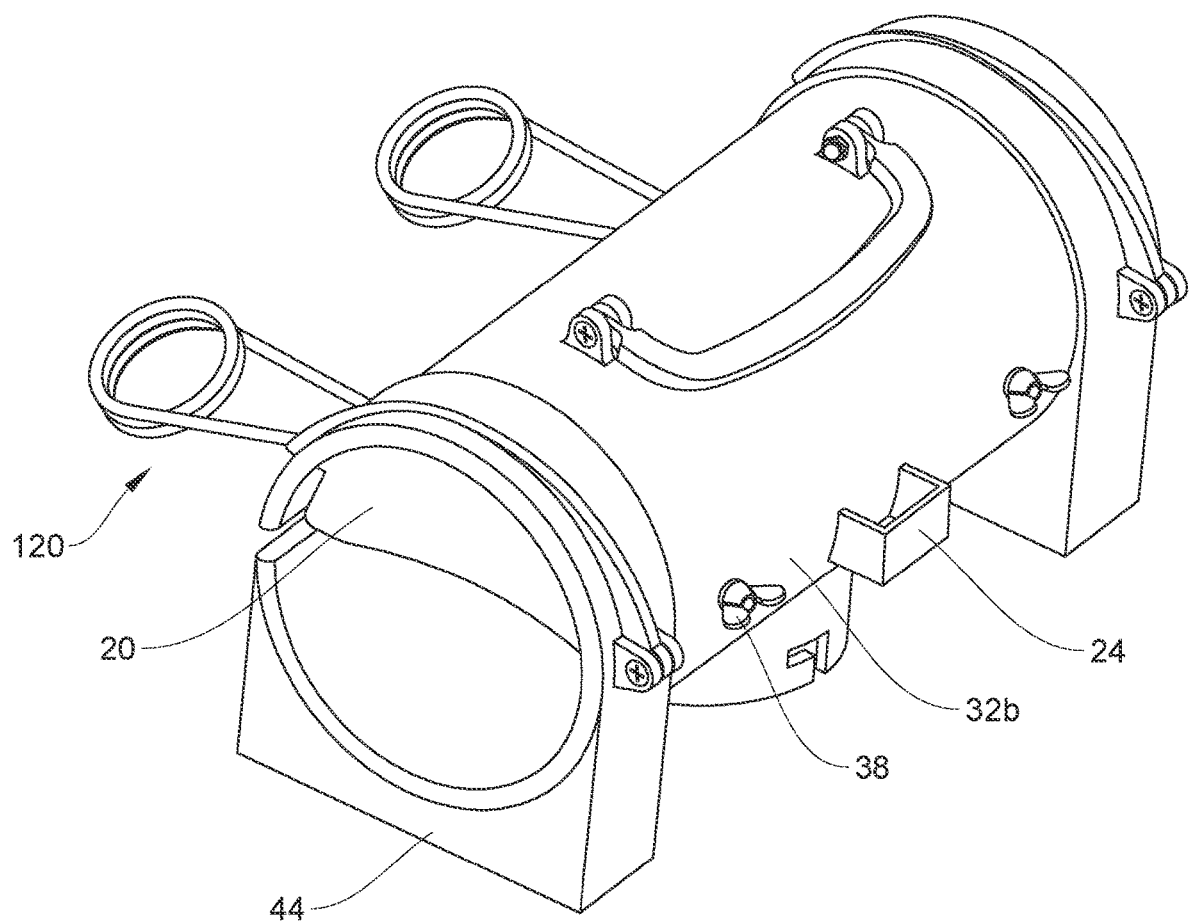
FIG. 7A shows the assembled animal trap according to the invention described herein.

The spring portion biases the jaws closed when the trigger mechanism is activated via a torsion spring 122 at a distal end 126a of a pair of spring arms 124 that are operatively connected to the jaws with eyelets 128 on the proximal end 126b of spring arms. Opposite from the spring portion, a peripheral post 130 connects to the jaws at a proximal end 132a and extends a post length ($L_P$) to a distal end 132b spaced from the jaws. Subsequently, a fastener 18 threads onto the distal end of the post to anchor the trapping mechanism in place. Although the particular type of fastener is not intended to be limiting, the preferred fastener is a wingnut 38 as shown in FIG. 7A. Alternatively, the post could be an anchoring extension that protrudes into the opening in the housing and allows the trap to hinge into the sprung position without having a threaded end 36 for receiving a threaded wingnut. As explained below, when the jaw portion is inserted into the housing the peripheral spring portion and post portion connect to the jaws at their respective proximal ends and extend outside of the housing to their respective distal ends. In operation, the extension post not only holds the trap in position for better functionality and keeps the trap body inside the housing after it snaps on the animal, the extension post also makes the trap fire at the exact location each time to ensure a quick and humane kill each time. Thus, the extension post makes the improved trap described herein the most humane kill traps on the market.

As with other body gripping style traps, the preferred trapping mechanism used herein is set by compressing the spring and subsequently locking the jaws in place with the dog. To assist with setting the trap and inserting it into the housing, a safety catch 134 may also be used to hold the spring arms in place after the spring is compressed but before the dog is engaged and the jaw portion is inserted into the housing. The set trap is then secured within the housing with the jaws within the interior space of the housing and the peripheral spring and post portion extending through the respective slot and aperture in the preferred embodiment. The safety catch on the spring arms outside of the housing can subsequently be disengaged and the trap can be sprung when the trigger is activated, releasing the dog and allowing the spring to bias the jaws into the closed position to catch and kill the animal.

In alternative embodiments, other trapping mechanisms can be used within the housing of the invention described herein without departing from the inventiveness of the present invention. For example, a traditional dual-spring style trap can be used with the housing rather than having a post portion opposite from the single spring. When a dual-spring style trapping mechanism is used, the second spring extends through another slot in the housing which replaces the post and aperture that is included in the preferred embodiment. Although not shown in the drawings, it will be appreciated that the other slot opening in this alternative embodiment substantially mirrors the slot shown in use with the single-spring embodiment. Thus, the innovative aspects of the present invention relate to the operative communication between the trapping mechanism and the housing and the scope of the invention should not be limited to the preferred circular 42 single-spring body gripping style trapping mechanism and cylindrical tubular housing particularly described below.

Figure 3A:
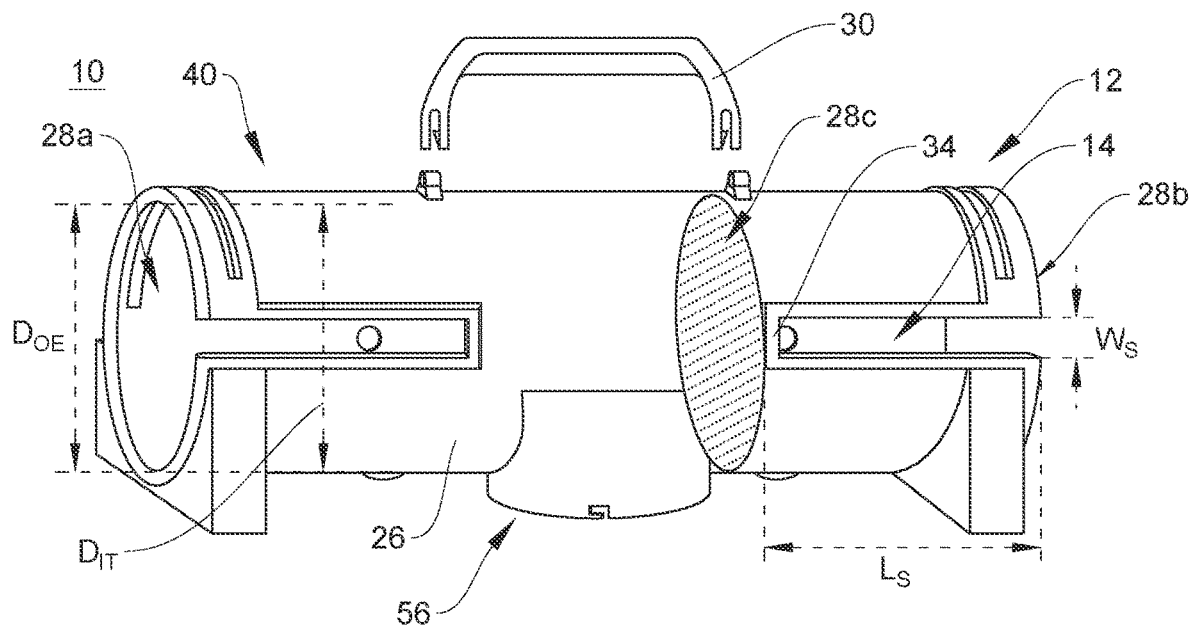
FIGS. 3A and 3B show perspective side views of the preferred tubular body according to the invention described herein.
Figure 3B:
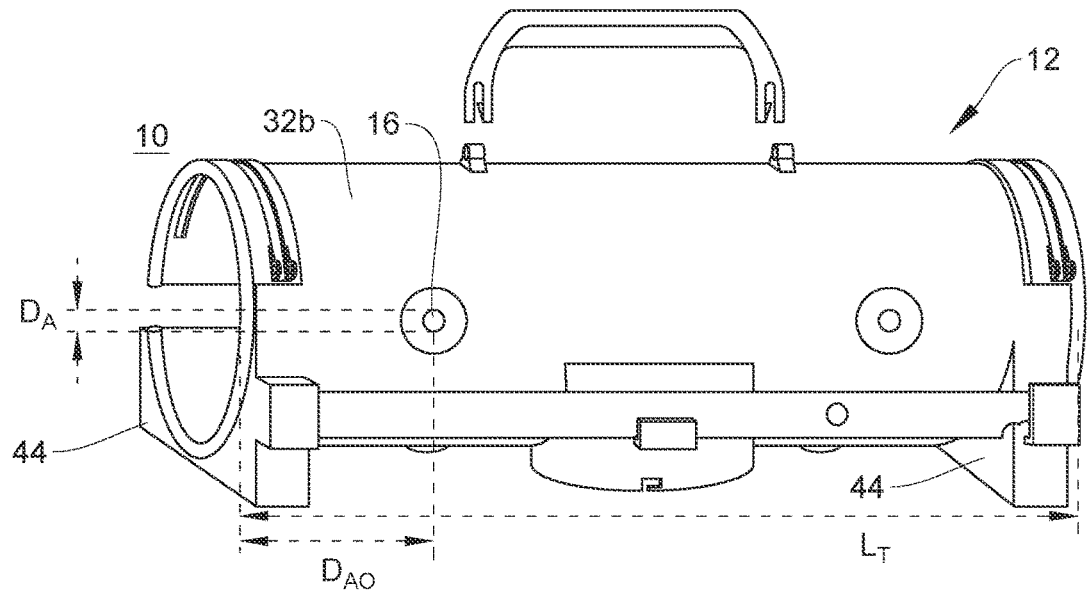
Figure 3C:
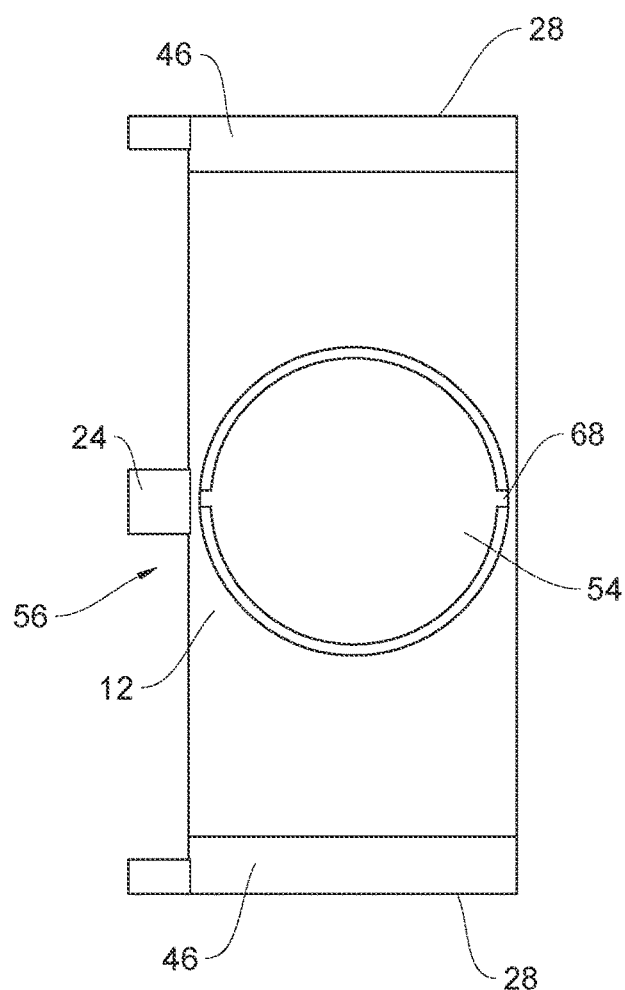
FIG. 3C shows a bottom view of the preferred tubular body according to the invention described herein.
Figure 7B:
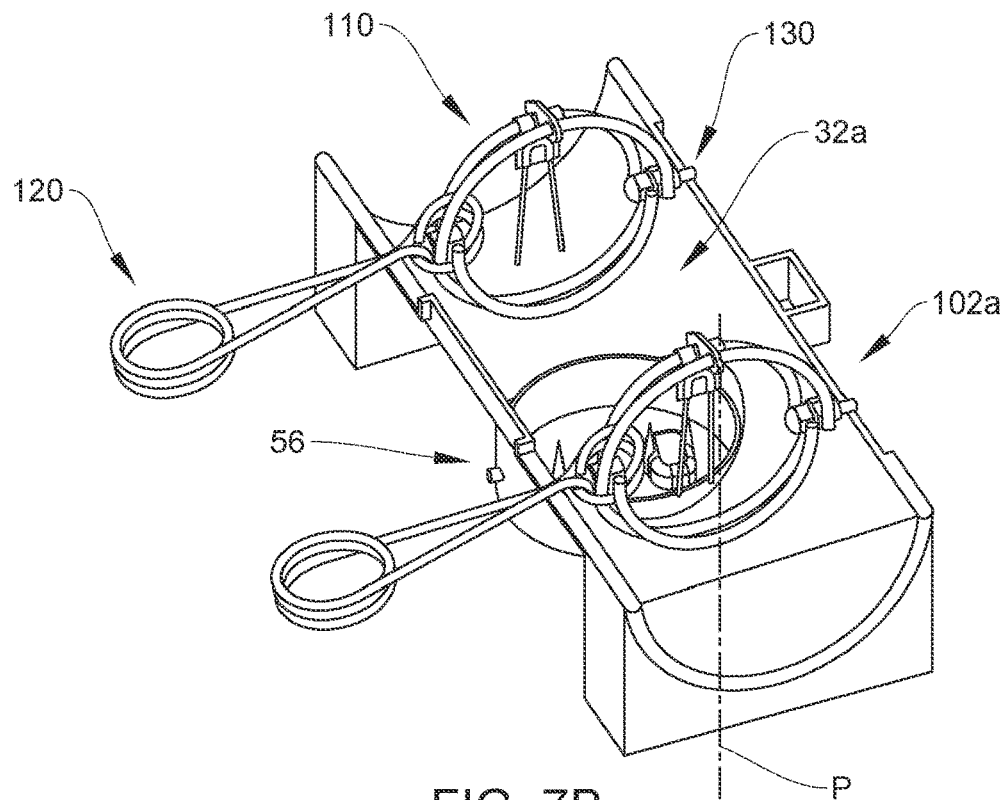
FIGS. 7B and 7C are cutaway perspective views of the set and sprung trap according to the invention described herein.
Figure 7C:
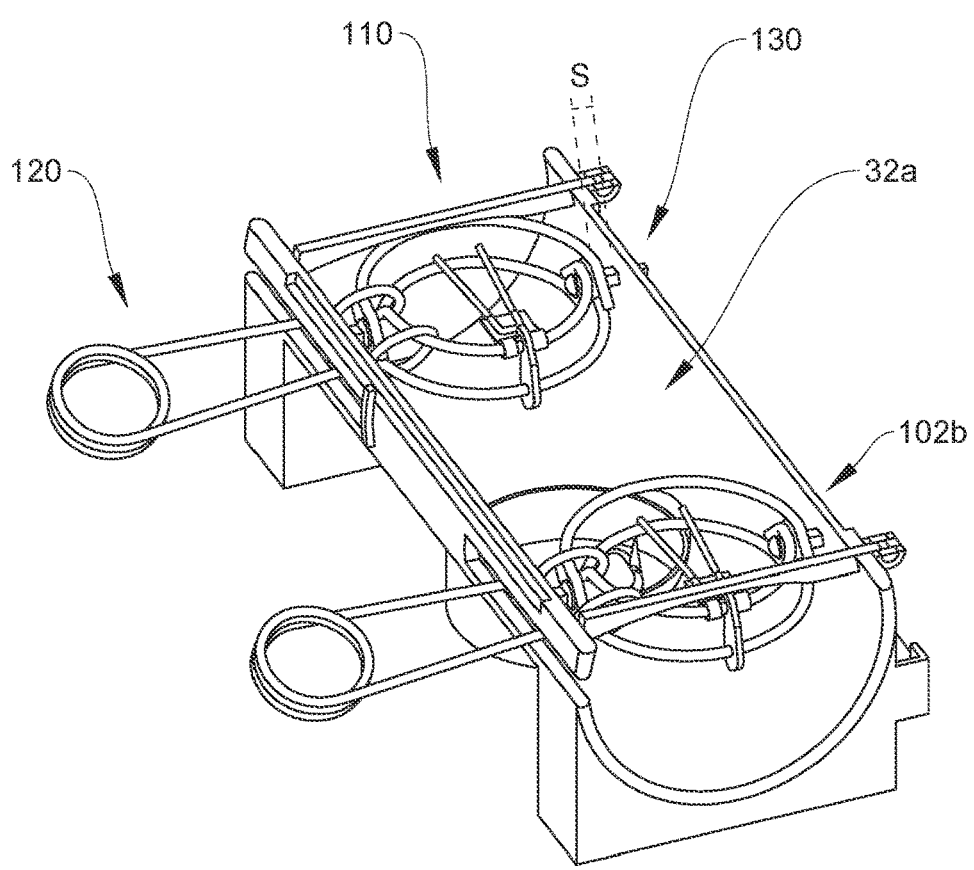

As shown in FIG. 3, the tubular body 12 of the housing 10 is preferably cylindrical in shape 40 with a sidewall 26 of the housing extending between the opposing ends 28 while other embodiments of the tubular body may be square, triangular, conical or alternatively shaped. The tubular housing has an inner diameter ($D_{IT}$) and at least one open end 28a. As shown in FIGS. 3 and 7, the preferred embodiment includes openings at both ends 28a and 28b that allow an animal to enter the trap from multiple entry points. Alternatively, the housing may have a closed end 28c opposite from the single open end with a single-entry point for target animals. To prevent the housing from rolling from side to side, at least one flat-bottom 46 base section 44 is provided on the exterior of the housing with the preferred embodiment including a pair of bases proximate to the opposite ends of the housing as shown in FIGS. 3A and 3B. Although the base sections act as legs on opposite end of the housing, the bait tray opening may also have a sidewall with a bottom edge that acts as a middle base portion that further stabilizes the housing. Furthermore, the particular shape of the base sections is not intended to be limiting with the rectangular sections shown in FIGS. 3A, 3B and 3C only representing the preferred embodiment. For example, singular base posts with a flat-bottom may be provided in place of the extended rectangular body.

It will be appreciated that the overall size of the housing, including the inner diameter, opening diameter ($D_{OE}$) and length ($L_T$), is proportional to the size of the trapping mechanism supported therein which will vary based on the size of the target animal. Generally, a body gripping style trapping mechanism for smaller rodents like mice may be less than five (5) inches in diameter while a larger diameter trapping mechanism can be used for raccoons and opossums. Accordingly, the size of the tubular body will vary based on use but it is an aspect of the present invention to position the perimeter of the trap body that is within the housing adjacent to the interior surface of the housing. Although some space is required between the interior surface of the housing and the trap body to allow the trap to spring closed, this space is as minimal as possible to prevent an animal who enters the housing from bypassing the trap mechanism altogether. Accordingly, the space between the jaws and the interior 32a of the housing (S) is no greater than the opening width of the slot.

Regardless of the shape of the tubular housing, a slot 14 is provided with the sidewall of the tube to receive the peripheral spring portion of the trapping mechanism. As shown in FIG. 3A, the opening of the slot is adjacent to the open end of the tube and the end 34 of the slot is spaced a slot length ($L_S$) into the sidewall of the tube. The slot has a width ($W_S$) and is configured to receive the spring portion of the trap such that jaws are positioned in the housing with the spring protruding from the housing. This configuration allows the jaws of the trapping mechanism to be adjacent to the interior surface of the housing without interfering with the operation of the spring. In embodiments with openings at each end of the tube, it will be appreciated that slots are provided proximate to each opening to receive corresponding pairs of trapping mechanisms as shown in FIG. 7. Although the particular dimensions are not intended to be limiting, the example housing shown in FIGS. 3A and 3B includes an opening diameter of four and three-quarter (4¾) inches, a slot length of four and one-half (4½) inches and a slot width of one-half (½) inch.

An opening 16 is provided in the sidewall of the housing opposite from the slot to receive the other peripheral portion of the trapping mechanism such that the peripheral portions of the trapping mechanism are substantially within the same vertical plane (P) when the trapping mechanism is set within the housing. In the preferred embodiment shown in FIG. 3B, the opening is opening is an aperture having an aperture diameter ($D_A$) that is less than the width of the width of the slot and which receives the post of the trapping mechanism. In contrast to the spring portion which slides into the slot from the open end, the post is inserted into the aperture from the interior of the housing and the fastener is subsequently threaded onto the threaded distal end of the post on the exterior of the housing 32b to secure the trapping mechanism thereto. As described above with regard to the slot and opening dimensions the distance ($D_{AO}$) between the open end of the housing and the opening not is intended to be limiting but is approximately three (3) inches in the embodiments shown in FIGS. 3A and 3B. Accordingly, the trap is held approximately three (3) inches into the interior of the housing.

The aperture is positioned on the sidewall of the tubular body at a location spaced a distance away from the open end with the distance between the aperture and the open end being less than the length of the slot to assure that the peripheral portions of the trapping mechanism can be substantially aligned within the same plane on opposite sides of the jaws when set. In operation, the post rotates within the aperture as the jaws rotate closed but remains in a fixed position relative to the open end whereas the spring slides within the slot as it decompresses and biases the jaws closed, trapping and killing the animal. Once sprung, the trapper can remove the fastener from the end of the post and subsequently remove the trapping mechanism and animal caught therein from the housing.

In an alternative embodiment, the opening may include another slot for receiving another peripheral spring when a dual-spring body gripping trap is used rather than an aperture for receiving a post. In this embodiment each of the springs slide into the respective slots and respectively slide within their respective slots as they decompress after the trap is sprung. Subsequently, the entire trapping mechanism can be slid outside of the housing by sliding the springs out of their slots to retrieve the animal.

Figure 4A:
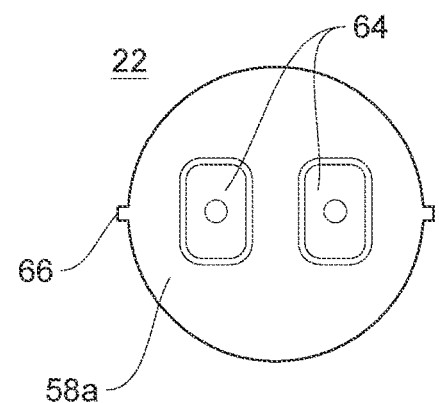
FIGS. 4A and 4B show detail views of the preferred bait tray according to the invention described herein.
Figure 4B:
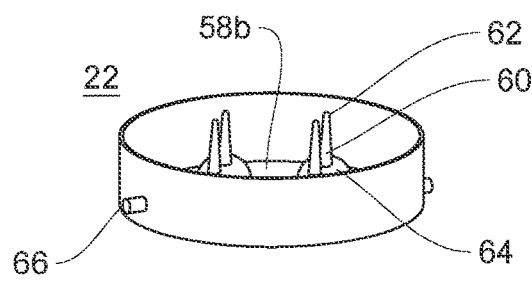

To attract target animals into the trap, a bait tray 22 is secured within the housing for holding bait. As shown in FIGS. 3C, 4A and 4B, the bait tray is configured to removably secure within an opening 54 in the housing at a location 56 between the ends of the housing and preferably between pair of trapping mechanisms as shown with the preferred embodiment. In alternative embodiments, the bait tray is positioned between the trapping mechanism and the closed end of the housing or may be incorporated into a cap that closes one end of the housing. In both embodiments, the animal will spring the trapping mechanism before reaching the bait within the bait tray. In operation, the bait tray allows users to safely set the tray without setting the spring traps off.

The bait tray in the preferred embodiment is circular in shape and threads into the opening in the housing in an attached position. Traditional threads may be used or the bait tray can include lateral tabs 66 that mate with slots 68 in the opening of the housing as shown in FIGS. 3C, 4A and 4B. To secure the bait within the tray and to make sure the bait is visible to animals outside of the housing, vertical bait support posts 60 extend from the top surface 58b of the bait tray such that bait supported on the distal end 62 of the post and spaced from the interior surface of the housing. Positioning the bait within the interior of the housing on the distal end of the post, above the surface of the bait tray, allows the bait to not only be visible through the open end of the housing but also allows assures passing through the housing is more likely to carry the aroma of the bait outside of the housing through the open ends. Opposite from the bait support posts on the exterior surface of the bait tray 58a, finger indents 64 are provided to aid a trapper in attaching and removing the bait tray.

Figure 5A:
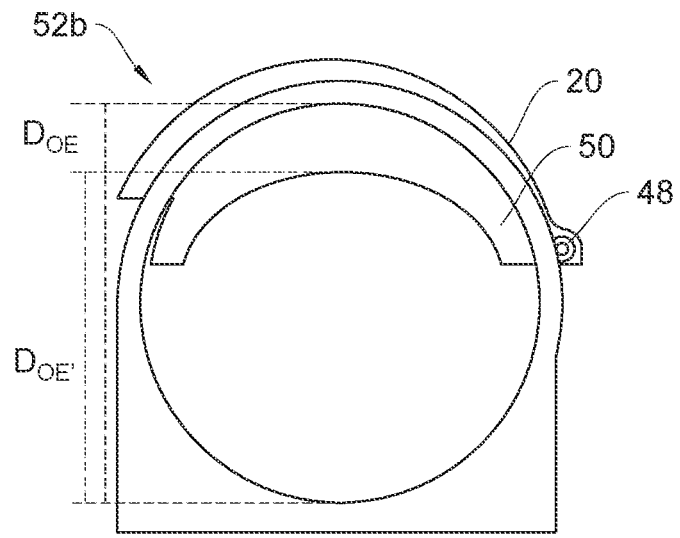
FIGS. 5A and 5B depict the gate according to the invention described herein.
Figure 5B:
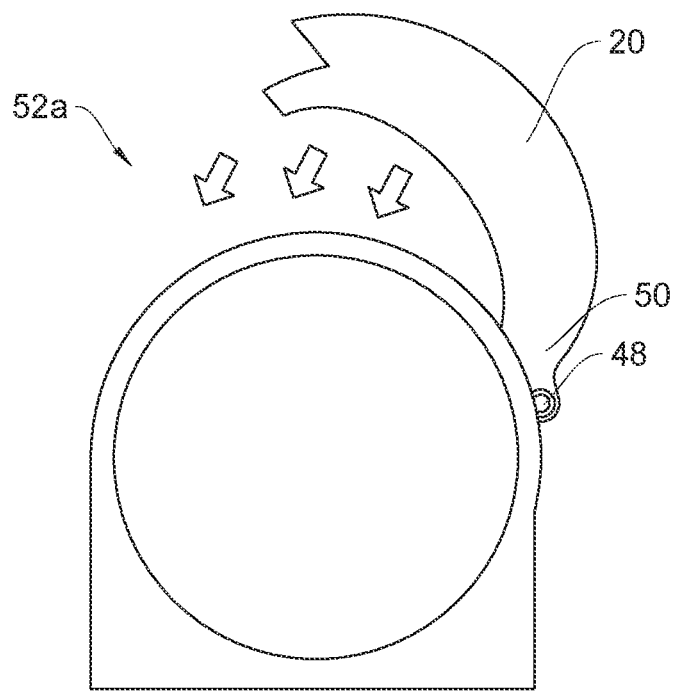
Figure 6A:
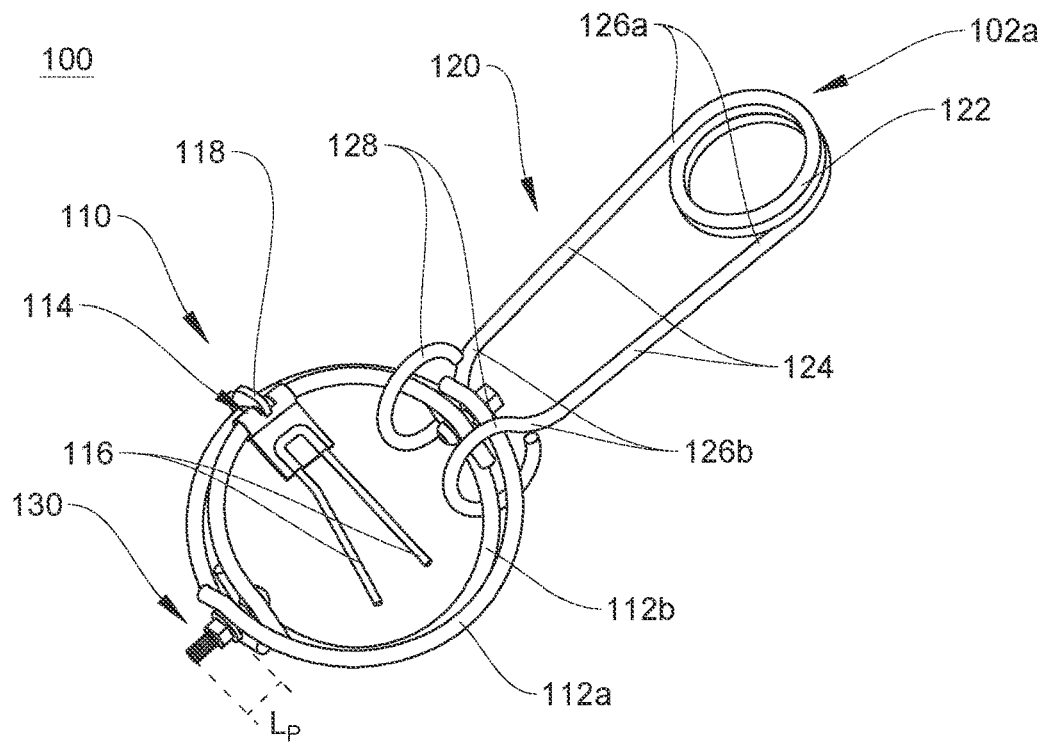
FIGS. 6A and 6B show the preferred trapping mechanism according to the invention described herein.
Figure 6B:
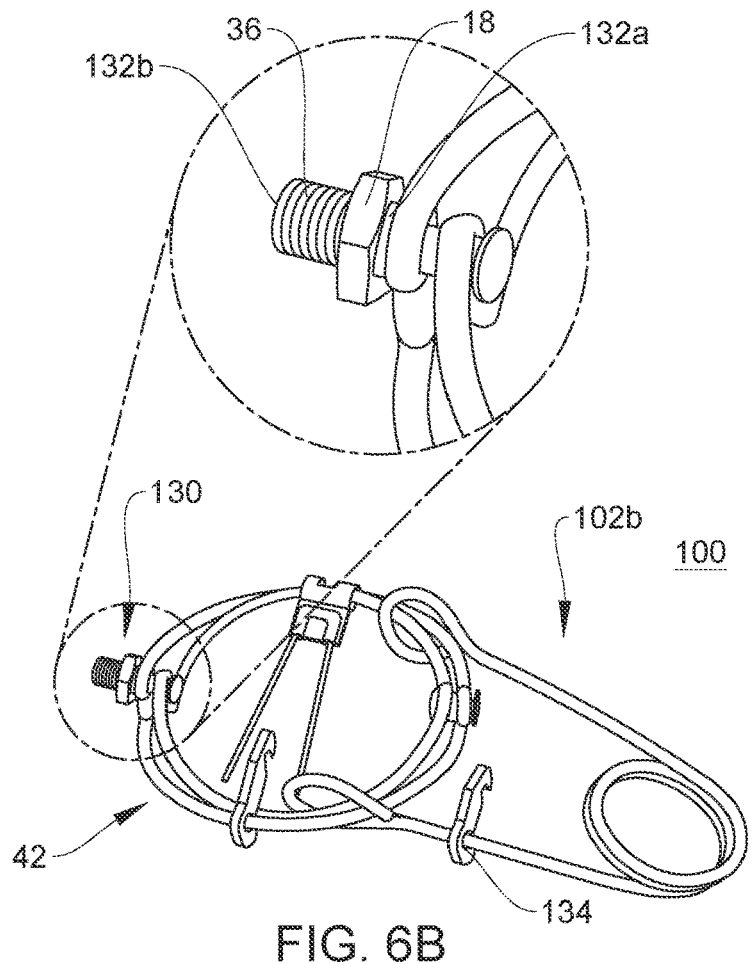

Gates 20 are also provided on the open ends of the housing to inhibit non-target animals from entering the housing and springing the trap by reducing the size of the opening ($D_{OE'}$). As shown in FIGS. 5A and 5B, the gate body 50 connects to the housing with a hinge 48 proximate to open end and pivot on the hinge between an open position 52a and closed position 52b. To allow target animals to enter the trap, the gate body is sized to cover less than one half (½) the diameter of the opening such that the smaller target animal can enter the housing while larger non-target animals cannot enter the housing. For example, when the trap described herein is used in a barn to target mice, the gate prevents cats who may also be in the trapping area and who may be attracted to the bait within the housing from entering the housing and springing the trapping mechanism.

Figure 8A:
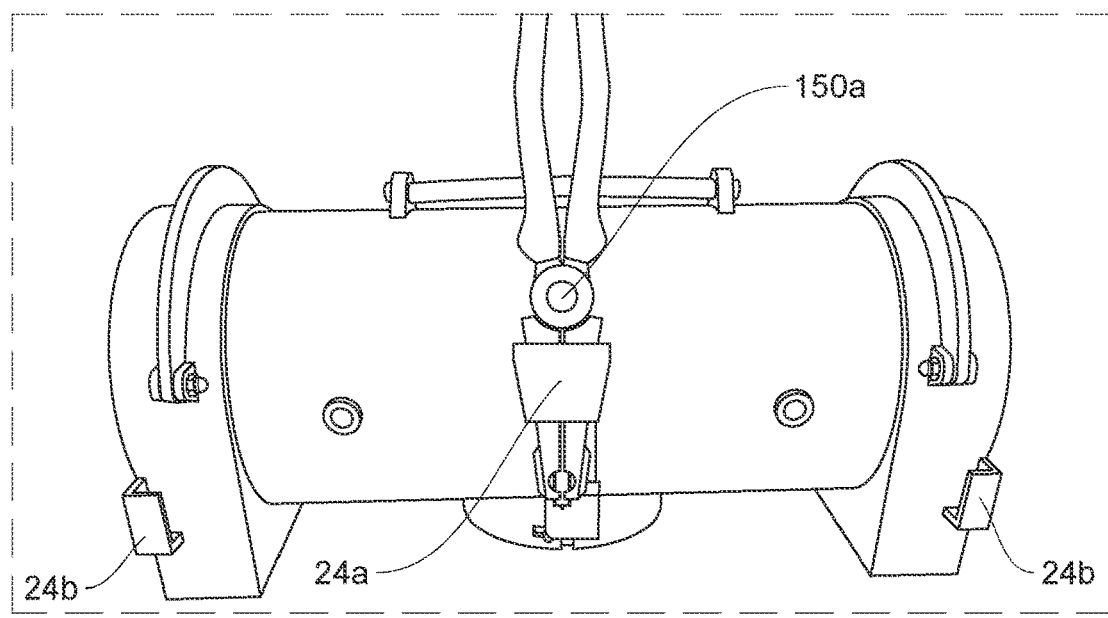
FIGS. 8A and 8B show alternative embodiments of the setting tool holder according to the invention described herein.
Figure 8B:
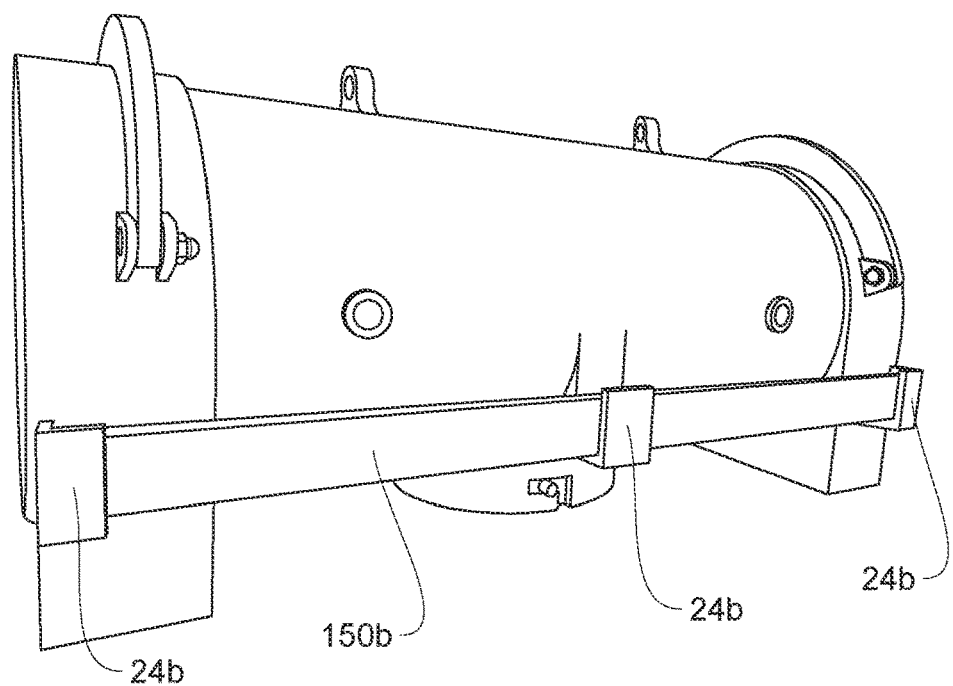

The exterior of the housing also includes handle 30 attachment for aiding the trapper in carrying the trap and positioning it at a desired location. In addition, a setting tool holder 24 is also affixed to the exterior of the housing and allows the trapper to keep the setting tool with the trapping unit. As shown in FIG. 3A, the handle attaches to the top of the housing and the setting tool holder is integrated into the side of the housing. In the preferred embodiment shown in FIGS. 7A and 8A, the setting tool holder is a V-shaped loop 24a which outwardly protrudes from the exterior of the housing such that the jaws of a plier style setting tool 150a can be inserted into the loop and held in place until the setting tool is needed by the trapper. Alternatively, the setting tool holder can include a set of hooks 24b outwardly protruding from the exterior of the housing wherein a planar setting tool 150b is received within the hooks as shown in FIG. 8B. To securely support the setting tool, it is preferred that this configuration include a pair of hooks proximate to each end of the tubular housing and a middle hook proximate to the midsection of the housing as particularly shown in FIG. 8B.

The embodiments were chosen and described to best explain the principles of the invention and its practical application to persons who are skilled in the art. As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A housing for a body gripping trap having a jaw portion, a spring portion, and a post portion, comprising:
   a tubular body comprising a sidewall, an open end, an interior space, and an exterior surface, wherein the sidewall longitudinally extends a tube length between the open end and an opposite end, and wherein the body gripping trap's jaw portion is received within the interior space of the tubular body proximate to the open end;
   a slot within the sidewall of the tubular body longitudinally extending a slot length from the open end of the tubular body to a slot end, wherein the slot is configured to allow the body gripping trap's spring portion to extend from the jaw portion within the interior space of the tubular body and to protrude through the slot beyond the exterior surface of the tubular body;
   an aperture within the sidewall of the tubular body opposite from the slot, wherein the aperture is spaced a distance from the open end of the tubular body, wherein the distance is less than the slot length, and wherein the aperture is configured to allow the body gripping trap's post portion to extend from the jaw portion within the interior space of the tubular body and to protrude through the aperture beyond the exterior surface of the tubular body; and
   a gate comprising a hinge and a gate body, wherein the hinge pivotally connects the gate body to the sidewall of the tubular body proximate to the open end, wherein the gate body pivots between an open position and a closed position, and wherein the gate body covers less than one half of the open end in the closed position.

2. The housing of claim 1, further comprising a bait tray releasably secured to another opening in the sidewall of the tubular body at a location between the slot end and the opposite end of the tubular body from the open end.

3. The housing of claim 2, wherein the bait tray removably engages the other opening within the sidewall in an attached position, and wherein the bait tray comprises a top surface situated within the interior space of the tubular body when the bait tray is in the attached position and a bottom surface outside of the tubular body when the bait tray is in the attached position.

4. The housing of claim 3, wherein the bait tray further comprises a bait support post extending from the top surface into the interior space of the tubular body, and wherein a distal end of the bait support post is visible through the open end of the tubular body when the bait tray is in the attached position.

5. The housing of claim 1, further comprising a fastener, wherein the fastener connects to the post portion of the body gripping trap proximate to the exterior surface of the tubular body.

6. The housing of claim 5, wherein the post has a threaded end and the fastener is a wingnut screwed onto the threaded end, wherein the open end has a first diameter, wherein the slot has a width in the sidewall of the tubular body, wherein the aperture has a second diameter, wherein the first diameter of the open end is greater than the width of the slot, and wherein the width of the slot is greater than the second diameter of the aperture.

7. The housing of claim 1, wherein the tubular body further comprises a cylindrical shape having an inner diameter, wherein the jaw portion of the body gripping trap is configured to have a circular shape with a diameter less than the inner diameter, and wherein the tubular body further comprises a base section with a flat-faced bottom side on the exterior surface proximate to at least one of the open end and the opposite end.

8. The housing of claim 1, further comprising a setting tool holder attached to the exterior of the tubular body, wherein the setting tool holder comprises at least one loop extending from and exterior surface of the sidewall of the housing, and wherein the loop is spaced away from the slot and the opening.

9. The housing of claim 1, wherein the tubular body's opposite end is selected from the group of ends consisting of another open end and a closed end.

10. The housing of claim 1, wherein the jaw portion of the body gripping trap comprises a pair of jaws and a trigger assembly, wherein the trigger assembly comprises a trigger mechanism and a dog, wherein the spring portion of the body gripping trap comprises a torsion spring and a pair of arms extending between the torsion spring and the pair of jaws, and wherein the torsion spring biases the jaws from a set position to a sprung position within the housing when the trigger mechanism is actuated and releases the dog holding the jaws in the set position.

11. A housing for a pair of body gripping traps which each have a jaw portion, a spring portion, and a post portion, comprising:
a tubular body comprising a sidewall, a pair of opposite open ends, an interior space and an exterior surface, wherein the sidewall longitudinally extends a tube length between the pair of opposite open ends, and wherein a first portion in each of the pair of trapping mechanisms are received within the interior of the tubular body proximate to respective opposite open ends;
a pair of slots within the sidewall of the tubular body, wherein each of the slots longitudinally extend a slot length from respective opposite open ends of the tubular body to corresponding slot ends, and wherein the pair of slots are configured to allow the body gripping traps' spring portions to extend from the respective jaw portions within the interior space of the tubular body and to protrude through the slots beyond the exterior surface of the tubular body
a pair of openings within the sidewall of the tubular body opposite from the pair of slots, and wherein the pair of openings are configured to allow the body gripping traps' post portions to extend from the respective jaw portions within the interior space of the tubular body and to protrude through the openings beyond the exterior surface of the tubular body;
a bait tray releasably secured within the sidewall of the tubular body at a location between the respective slot ends; and
a pair of gates, wherein each gate comprises a hinge and a gate body, wherein the hinges pivotally connect the gate bodies to the sidewall of the tubular body proximate to the opposite open ends, wherein the gate bodies pivot between an open position and a closed position, and wherein the gate bodies cover less than one half of the opposite open ends in the closed positions.

12. The housing of claim 11, wherein the bait tray removably engages the other opening within the sidewall in an attached position, and wherein the bait tray comprises a top surface situated within the interior of the tubular body when the bait tray is in the attached position and a bottom surface outside of the tubular body when the bait tray is in the attached position.

13. The housing of claim 12, wherein the bait tray further comprises a bait support post extending from the top surface into the interior of the tubular body, wherein a distal end of the bait support post is visible through the opposite open ends of the tubular body when the bait tray is in the attached position, and wherein the bait tray further comprises at least one indentation within the bottom surface.

14. The housing of claim 11, wherein the openings further comprise an aperture spaced a distance from the opposite open ends of the tubular body, wherein the distance is less than the slot length, wherein each of the opposite open ends have a first diameter, wherein the each of the slots have a width in the sidewall of the tubular body, wherein each of the apertures have a second diameter, wherein the first diameter of the open ends is greater than the width of the slots, and wherein the width of the slots is greater than the second diameter of the apertures.

15. The housing of claim 11, further comprising a setting tool holder attached to the exterior of the tubular body, wherein the setting tool holder comprises at least one loop extending from and exterior surface of the sidewall of the housing, and wherein the loop is spaced away from the slot and the opening.

16. The housing of claim 11, wherein the tubular body further comprises a pair of base sections proximate to the pair of opposite open ends, wherein each of the base sections comprise a flat-faced bottom side, wherein the jaw portions of the body gripping traps each comprise a pair of jaws and a trigger assembly, wherein the trigger assembly comprises a trigger mechanism and a dog, wherein the spring portions of each of the body gripping traps comprise a torsion spring and a pair of arms extending between the torsion spring and the pair of jaws, and wherein the torsion spring biases the jaws from a set position to a sprung position within the housing when the trigger mechanism is actuated and releases the dog holding the jaws in the set position.

17. A trap, comprising:
a trapping mechanism comprising a jaw portion, a first peripheral trap portion extending from a first proximal end at one side of the jaw portion to a first distal end, and a second peripheral trap portion extending from a second proximal end at an opposite side of the jaw portion to a second distal end, and wherein at least one of the first peripheral trap portion and the second peripheral trap portion comprises a spring portion operatively moving the jaw portion from a set position to a sprung position;
a tubular body comprising a sidewall, an open end, an interior space, and an exterior surface, wherein the sidewall longitudinally extends a tube length between the open end and an opposite end, and wherein the jaw portion is entirely received within the interior of the tubular body proximate to the open end;
a slot within the sidewall of the tubular body longitudinally extending a slot length from a slot open end adjacent to the open end of the tubular body to a slot end, and wherein the first distal end of the first peripheral trap portion protrudes through the slot;
an opening within the sidewall of the tubular body opposite from the slot, wherein the second distal end of the second peripheral trap portion protrudes through the aperture;

a bait tray releasably secured to another opening in the sidewall of the tubular body at a location between the trapping mechanism and the opposite end of the tubular body; and a gate comprising a hinge and a gate body, wherein the hinge pivotally connects the gate body to the sidewall of the tubular body proximate to the open end, wherein the gate body pivots between an open position and a closed position, and wherein the gate body covers less than one half of the open end in the closed position.

18. The trap of claim 17, wherein the jaw portion comprises a pair of jaws and a trigger assembly, wherein the trigger assembly comprises a trigger mechanism and a dog, wherein the first peripheral trap portion comprises a first pair of arms respectively connected to the pair of jaws at the first proximal end and a first spring connecting the first pair of arms at the first distal end of the first peripheral trap portion, and wherein the second peripheral trap portion comprises at least one of a post and a second spring with a second pair of arms, and wherein at least the first spring biases the jaws from the set position to the sprung position within the housing when the trigger mechanism is actuated and releases the dog holding the jaws in the set position.

19. The trap of claim 18, further comprising a fastener connected to the post at the distal end of the second peripheral trap portion.

20. The trap of claim 17, wherein the bait tray removably engages the other opening within the sidewall in an attached position, wherein the bait tray comprises a top surface situated within the interior of the tubular body when the bait tray is in the attached position and a bottom surface outside of the tubular body when the bait tray is in the attached position, wherein the bait tray further comprises a bait support post extending from the top surface into the interior of the tubular body, and wherein a distal end of the bait support post is visible through the open end of the tubular body when the bait tray is in the attached position.

* * * * *